United States Patent
Seaton et al.

(10) Patent No.: US 9,880,931 B2
(45) Date of Patent: Jan. 30, 2018

(54) SAFEPOINTS FOR GUEST LANGUAGES ON A VIRTUAL MACHINE

(71) Applicant: Oracle International Corporation, Redwood Shores, CA (US)

(72) Inventors: Chris Seaton, Chester (GB); Benoit Daloze, Obersterreich (AT)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 14/931,968

(22) Filed: Nov. 4, 2015

(65) Prior Publication Data

US 2017/0109182 A1    Apr. 20, 2017

Related U.S. Application Data

(60) Provisional application No. 62/242,290, filed on Oct. 15, 2015.

(51) Int. Cl.
*G06F 9/455* (2006.01)
*G06F 9/46* (2006.01)
(Continued)

(52) U.S. Cl.
CPC .......... *G06F 12/0253* (2013.01); *G06F 9/455* (2013.01); *G06F 9/4552* (2013.01); *G06F 9/45504* (2013.01); *G06F 9/45533* (2013.01); *G06F 9/461* (2013.01); *G06F 9/50* (2013.01); *G06F 9/5005* (2013.01); *G06F 9/5022* (2013.01); *G06F 9/522* (2013.01);
(Continued)

(58) Field of Classification Search
None
See application file for complete search history.

(56) References Cited

U.S. PATENT DOCUMENTS 6,523,059 B1 * 2/2003 Schmidt .................... G06F 9/52
707/999.202
7,725,885 B1 * 5/2010 Pradhan .............. G06F 9/45516
717/148

(Continued)

OTHER PUBLICATIONS

JRuby+Truffle, "A High-Performance Truffle Backend for JRuby" Oct. 3, 2015, 5 pages.

(Continued)

*Primary Examiner* — Charles Swift
(74) *Attorney, Agent, or Firm* — Osha Liang LLP

(57) ABSTRACT

An application programming interface (API) may include an initiator configured to initiate a guest safepoint via an action represented in a guest language executed on a virtual machine, provide a safepoint action to a group of guest threads, synchronize the guest threads such that each guest thread in the group executes the safepoint action once all guest threads in the group enter the guest safepoint, and synchronize the guest threads such that each guest thread in the group exits the guest safepoint once all guest threads in the group complete execution of the safepoint action. The API may also include a guest configured to determine whether a guest safepoint is initiated, enter the guest safepoint, execute the safepoint action while execution of a guest action is paused, and exit the guest safepoint and resume execution of the guest action once the safepoint action completes execution.

18 Claims, 8 Drawing Sheets

(51) Int. Cl.
*G06F 12/02* (2006.01)
*G06F 12/00* (2006.01)
*G06F 9/50* (2006.01)
*G06F 9/52* (2006.01)

(52) U.S. Cl.
CPC .............. *G06F 12/00* (2013.01); *G06F 12/02* (2013.01); *G06F 12/0223* (2013.01); *G06F 12/0261* (2013.01); *G06F 12/0269* (2013.01); *G06F 12/0276* (2013.01)

(56) References Cited

U.S. PATENT DOCUMENTS

| | | | | |
|---|---|---|---|---|
| 9,213,562 | B2* | 12/2015 | Veresov | G06F 9/45504 |
| 2001/0054057 | A1* | 12/2001 | Long | G06F 9/52 |
| | | | | 718/108 |
| 2002/0052926 | A1* | 5/2002 | Bush | G06F 8/458 |
| | | | | 709/217 |
| 2009/0063595 | A1* | 3/2009 | Stoodley | G06F 12/0253 |
| 2010/0192139 | A1* | 7/2010 | Titzer | G06F 9/485 |
| | | | | 717/151 |
| 2011/0202907 | A1* | 8/2011 | Dice | G06F 9/45516 |
| | | | | 717/148 |
| 2014/0033213 | A1* | 1/2014 | Hudson | G06F 9/54 |
| | | | | 718/102 |
| 2014/0082632 | A1* | 3/2014 | Tene | G06F 9/3001 |
| | | | | 718/108 |
| 2015/0278077 | A1* | 10/2015 | Dawson | G06F 11/3688 |
| | | | | 717/130 |
| 2016/0267000 | A1* | 9/2016 | Rose | G06F 11/3688 |

OTHER PUBLICATIONS

Holzle, U. et al., "Debugging optimized code with dynamic deoptimization"; Proceedings of the ACM SIGPLAN 1992 conference on Programming language design and implementation, New York, New York, USA, Jun. 1992, pp. 32-43 (12 pages).

Deutsch, L. P. et al., "Efficient Implementation of the Smalltalk-80 System", In Proceedings of the 11th ACM SIGACT-SIGPLAN Symposium on Principles of Programming languages, Salt Lake City, Utah, USA, Jan. 15-18, 1984, pp. 297-302 (6 pages).

Zhang, M. et al., "Low-overhead software transactional memory with progress guarantees and strong semantics", Proceedings of the 20th ACM SIGPLAN Symposium on Principles and Practice of Parallel Programming, San Francisco, California, USA, Feb. 7-11, 2015, pp. 97-108 (12 pages).

* cited by examiner

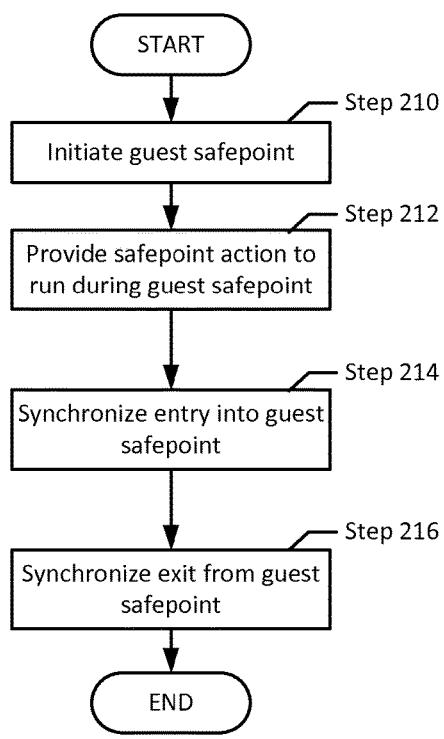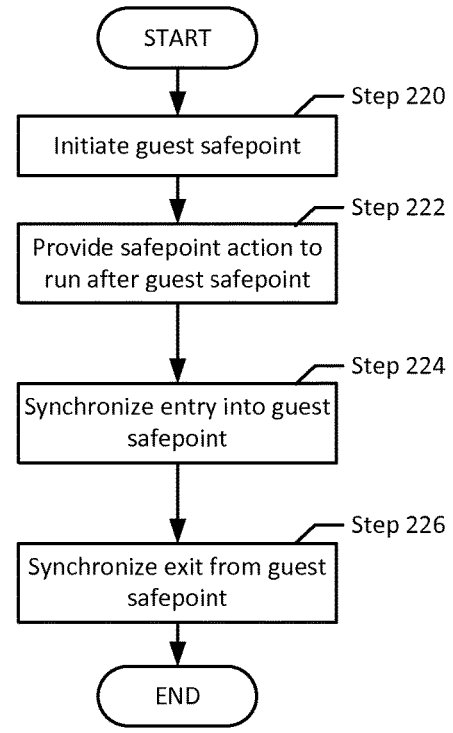
FIG. 2A
FIG. 2B

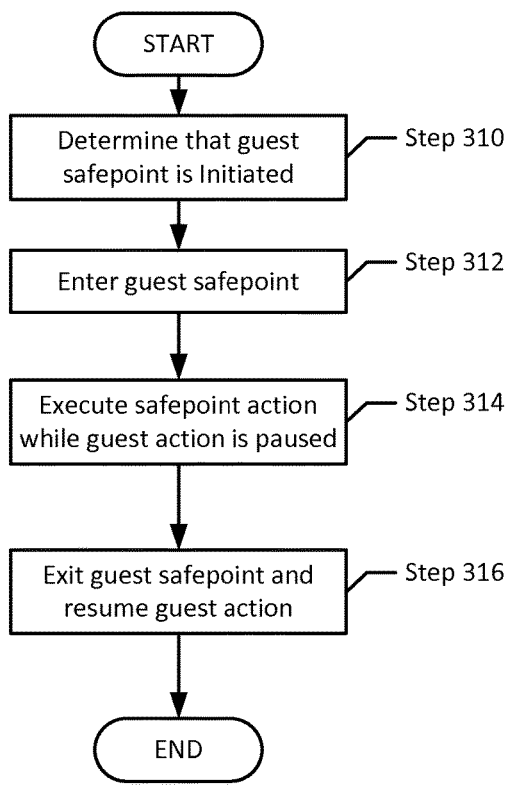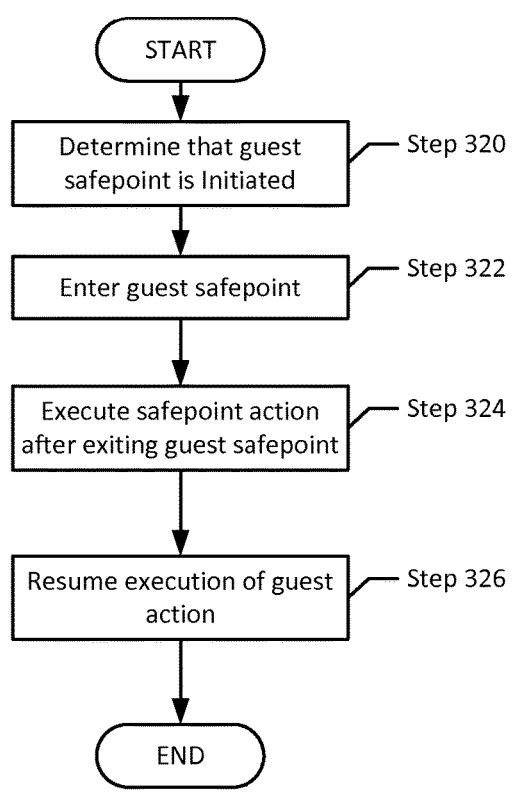
FIG. 3A
FIG. 3B

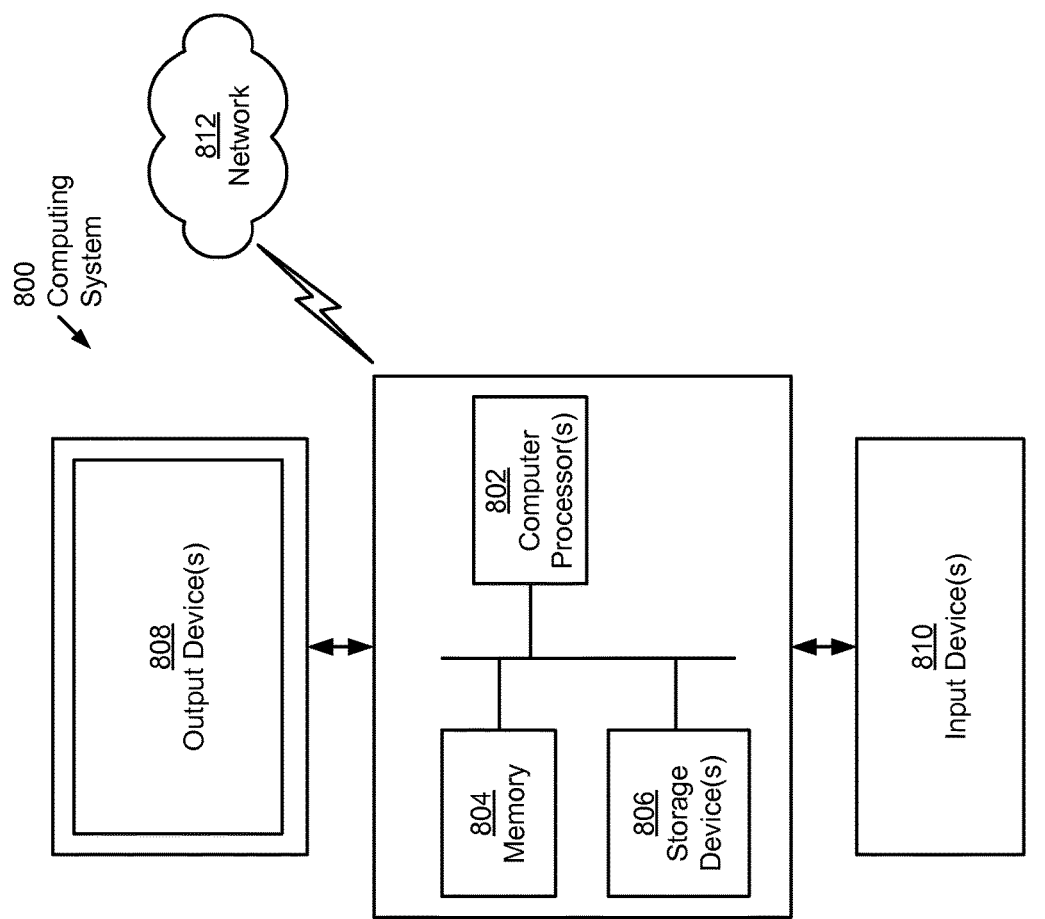

SAFEPOINTS FOR GUEST LANGUAGES ON A VIRTUAL MACHINE

CROSS-REFERENCE TO RELATED APPLICATION

This non-provisional patent application claims priority under 35 U.S.C. § 119(e) to U.S. Provisional Patent Application Ser. No. 62/242,290, filed on Oct. 15, 2015, and is hereby incorporated by reference in its entirety.

BACKGROUND

A virtual machine (VM) is a collection of services that support a running program at a higher level of abstraction than a physical architecture provides. This may include services such as automatic memory management through garbage collection, dynamic optimization through just-in-time compilation, debugging and instrumentation, and dynamic code loading and reloading. To provide many of these services the VM needs to be able to pause running a program to inspect and modify its state. For example, a stop-the-world garbage collector will at some point need to pause all application threads to update the heap when objects are moved and collected. Conventional architectures and system libraries for threading generally do not provide a native mechanism to pause a running thread, so the VM must provide this itself by adding code to the sequence of instructions. Any added code should have low overhead, since re-using existing synchronization primitives such as locks would mean that application threads would often use these locks even though they are infrequently required. In addition, the paused threads must be paused in a consistent state where modifications to the heap will not conflict with the work of the application threads.

A safepoint is a VM mechanism that allows one thread to pause other threads, with data structures in a consistent state. Existing activity ceases, and new activity proceeds in a consistent state undisturbed by the actions of other threads. The execution of certain actions is guaranteed to not be split across a safepoint, such as reading the address of an object and then writing to that object. If the VM and its programs are in a safepoint, then it is safe to modify shared data structures. Safepoints are used to implement VM services such as stop-the-world garbage collection, which move objects. The VM uses a safepoint to prevent other threads from mutating the heap during such object-moving operations. VM safepoints are restricted to run predefined code in only a subset of threads.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a computer system including a virtual machine, an initiator thread configured to execute a first action represented in a guest language on the virtual machine with functionality to initiate a guest safepoint and to provide a safepoint action, and a group of one or more guest threads configured to execute a guest action represented in a guest language on the virtual machine, execute the safepoint action while execution of the guest action is paused, and resume execution of the guest action once the safepoint action completes execution in each guest thread in the group of guest threads.

In general, in one aspect, one or more embodiments relate to a method for implementing a guest safepoint including initiating the guest safepoint by an action represented in a guest language, providing a safepoint action to be executed during the guest safepoint, synchronizing entry into the guest safepoint, and synchronizing exit from the guest safepoint.

In general, in one aspect, one or more embodiments relate to a method for implementing a guest safepoint including determining whether the guest safepoint is initiated, entering the guest safepoint, executing a safepoint action while execution of a guest action is paused, and exiting the guest safepoint and resuming execution of the guest action.

In general, in one aspect, one or more embodiments relate to an application programming interface (API) including an initiator configured to initiate a guest safepoint via an action represented in a guest language executed on a virtual machine, provide a safepoint action to a group of one or more guest threads, synchronize the one or more guest threads such that each guest thread in the group executes the safepoint action once all guest threads in the group enter the guest safepoint, and synchronize the one or more guest threads such that each guest thread in the group exits the guest safepoint once all guest threads in the group complete execution of the safepoint action. The API also includes a guest configured to determine whether a guest safepoint is initiated, enter the guest safepoint, execute the safepoint action while execution of a guest action is paused, and exit the guest safepoint and resume execution of the guest action once the safepoint action completes execution.

Other aspects of the invention will be apparent from the following description and the appended claims.

BRIEF DESCRIPTION OF DRAWINGS

FIG. 2A and FIG. 2B show flowcharts in accordance with one or more embodiments of the invention.

FIG. 3A and FIG. 3B show flowcharts in accordance with one or more embodiments of the invention.

FIG. 8 shows a computing system in accordance with one or more embodiments of the invention.

DETAILED DESCRIPTION

Figure 1:
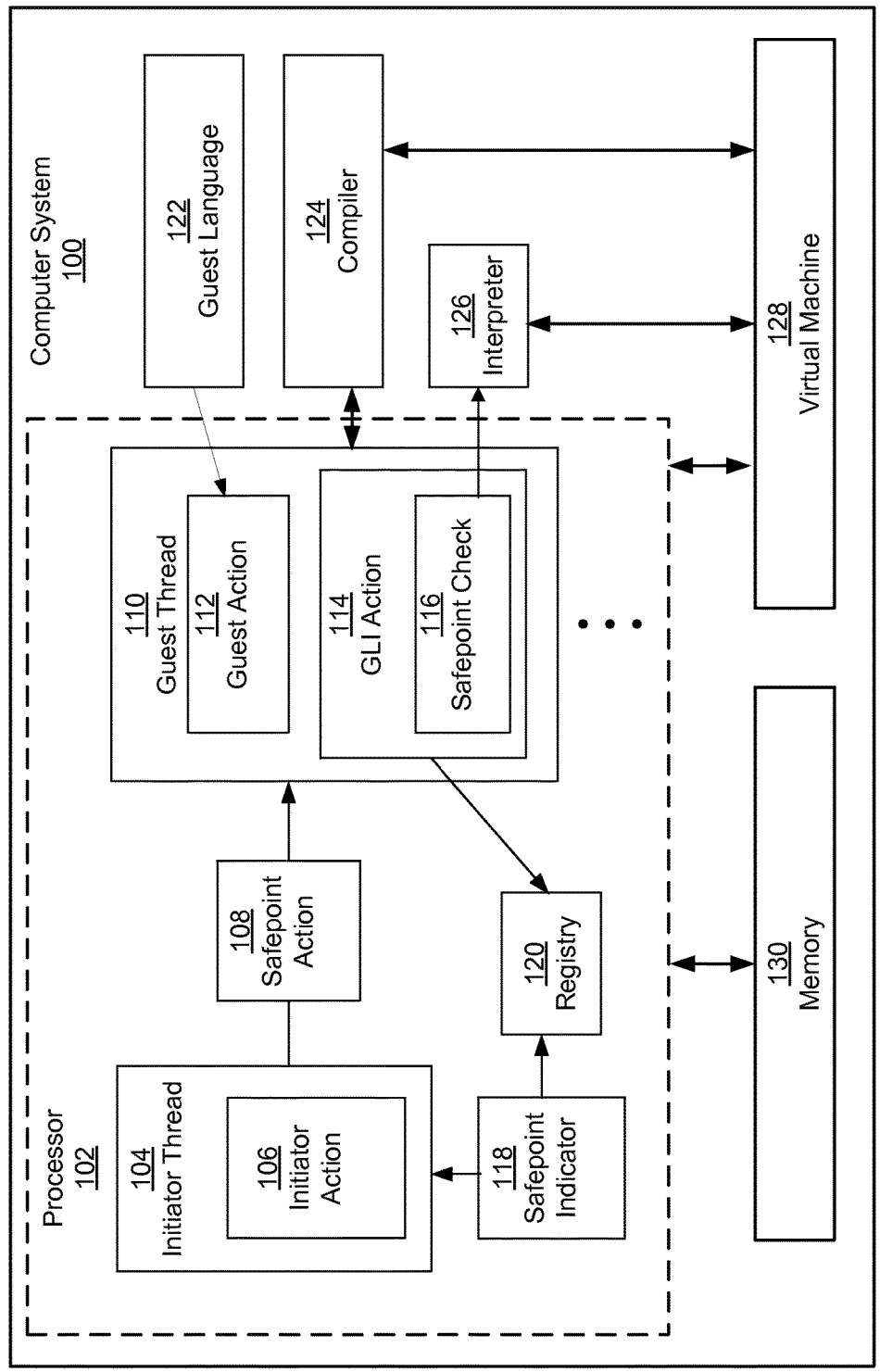
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to providing a guest safepoint mechanism that may be initiated from guest programming language code, permitting arbitrary guest language code to be run in a consistent state, without needing to be concerned about uncontrolled modifications of data structures (e.g., the heap). Guest programming language code is code written in any number of programming languages (e.g., Java, Ruby, C, C++, JavaScript, Python, Perl, etc.). In contrast, conventional VM safepoints are initiated by privileged VM instructions. In one or more embodiments of the invention, guest safepoints may be implemented using VM safepoints. However, during VM safepoints, normal VM services are typically unavailable (since conventional VM safepoints are initiated by privileged VM instructions that do not require access to VM services). Since guest language code may require access to VM services, one or more embodiments of the invention provide a mechanism for deferred safepoints, where code run in guest safepoints executes just after a VM safepoint exits, once normal VM services are resumed, concurrently with other threads. For example, deferred action guest safepoints may be useful for callbacks, which may themselves use safepoints or run for a longer period of time. One or more embodiments of the invention provide an application programming interface (API) for guest safepoints, including deferred action guest safepoints. Uses for this API include: efficient intra-thread communication, signal handling in an existing thread, enumeration of all live objects, call stack examination, always-available debugging, and deterministic parallel execution.

FIG. 1 shows a system in accordance with one or more embodiments of the invention. As shown in FIG. 1, the system includes a computer system (100). In one or more embodiments of the invention, the computer system (100) includes a processor (102), a guest language (122), a compiler (124), an interpreter (126), a virtual machine (128), and a memory (130). Each of these components is described below.

In one or more embodiments of the invention, a computer system (100) is any device and/or any set of devices (e.g., a distributed computing system) capable of electronically processing instructions, serially or in parallel, and that includes at least the minimum processing power, memory, cache(s), input and output device(s), operatively connected storage device(s) and/or network connectivity in order to contribute to the performance of at least some portion of the functionality described in accordance with one or more embodiments of the invention. Examples of computer systems include, but are not limited to, one or more server machines (e.g., a blade server in a blade server chassis), desktop computers, mobile devices (e.g., laptop computer, smartphone, personal digital assistant, tablet computer, and/or any other mobile computing device), any other type of computing device with the aforementioned minimum requirements, and/or any combination of the listed examples. In one or more embodiments of the invention, a computer system includes hardware, software, firmware, circuitry, integrated circuits, circuit elements implemented using a semiconducting material, registers, caches, memory controller(s), cache controller(s) and/or any combination thereof.

As shown in FIG. 1, the computer system (100) includes a processor (102). A processor (102) may refer to single-core processors or multi-core processors. In one or more embodiments of the invention, a processor is any hardware capable of, at least in part, executing sequences of instructions (e.g., the instructions of a computer program) in a computer system (100). In one or more embodiments of the invention, a processor is a collection of electronic circuitry capable of implementing various actions (e.g., arithmetic, Boolean logic, move data, etc.) in order to carry out instructions (e.g., write to a variable, read a value, etc.). For example, a processor may be a microprocessor fabricated, at least in part using a semiconducting material, as one or more integrated circuits.

In one or more embodiments of the invention, the processor (102) includes an initiator thread (104), a safepoint action (108), one or more guest threads (110), a safepoint indicator (118), and a registry (120). Each of these components is described below.

A thread (e.g., initiator thread (104) and one or more guest threads (110)) is a logically separate (i.e., isolated) instruction execution stream in which actions (e.g., initiator action (106), safepoint action (108), guest action (112), etc.) may be executed by a processor (102). An action (106, 108, 112) may be any sequence of instructions, written as source code in a guest language (122). A guest language (122) may be a programming language (e.g., Java, Ruby, C, C++, JavaScript, Python, Perl, etc.) now known or that may be later developed. An action (106, 108, 112) may be a syntactic and semantic method of expression for communicating a program's instructions to a computer system (100). In one or more embodiments of the invention, the safepoint action (108) and guest actions (112) are represented in different guest programming languages (122).

In one or more embodiments of the invention, the initiator thread (104) is the initiator of a guest safepoint, and provides, by executing an initiator action (106), a safepoint action (108) to be executed by one or more guest threads (110) during the guest safepoint. In one or more embodiments of the invention, a guest thread (110) executes a guest action (112). In one or more embodiments of the invention, threads (104, 110) may communicate and synchronize via a variety of techniques, including but not limited to: shared memory (e.g., with synchronized access, such as via a mutex), message-passing, and/or procedure calls (e.g., via an Application Programming Interface (API)).

In one or more embodiments of the invention, a thread (104, 110) may have a thread queue (not shown) in which one or more operations and/or functions are placed to schedule execution by the processor (102) associated with the thread (104, 110). In one or more embodiments of the invention, a computer system with more than one processor (102) includes one thread (104, 110) per processor (102). Threads (104, 110) may be implemented using a multi-core multi-platform environment.

In one or more embodiments of the invention, a safepoint indicator (118) indicates the initiation of a guest safepoint. In one or more embodiments of the invention, a safepoint check (116) is used by guest threads (110) to determine that a guest safepoint has been initiated, by examining the state of the safepoint indicator (118). A safepoint check (116) may be executed at locations within the code (e.g., a guest action (112)) where it is safe to pause a thread. In one or more embodiments of the invention, a safepoint check (116) is inserted into a guest language implementation (GLI) action (114), the compiled version of a guest action (112). For example, in one or more embodiments of the invention, a safepoint check (116) may be inserted into a guest language implementation (GLI) action (114), at the start of each method, and within each loop. In one or more embodiments of the invention, the safepoint indicator (118) may be implemented as a variable (e.g., a flag, mutex, etc.). In one or more embodiments of the invention, the safepoint indicator (118) may be implemented as a volatile variable (e.g., a flag), to prevent a compiler (124) from performing an optimization to cache the value of the variable. Declaring a variable as volatile forces the value of the variable to be read each time a safepoint check (116) requests the variable's value, which ensures that the most current (i.e., not out-of-date, cached) value of the variable will be accessed. However, volatile variables incur a high performance overhead when the variable is frequently accessed.

In accordance with one or more embodiments of the invention, an initiator thread (104) receives notifications from guest threads (110) regarding various events, including but not limited to de-optimization of safepoint checks (116) and the completion of safepoint actions (108).

In one or more embodiments of the invention, the dependency of the safepoint check (116) on the safepoint indicator (118) is represented in a registry (120). In one or more embodiments of the invention, the registry (120) is any type of storage unit and/or device (e.g., random access memory (RAM), solid state device, magnetic device, file system, database, collection of tables, or any other storage mechanism) for storing data. Further, the registry (120) may include multiple different storage units and/or devices. The multiple different storage units and/or devices may or may not be of the same type or located at the same physical site.

In one or more embodiments of the invention, the dependency of a safepoint check (116) on a safepoint indicator (118) is implemented using a mechanism that represents and manages dependency information. In one or more embodiments of the invention, an assumption framework (e.g., as used in the Truffle language implementation framework, see, e.g., C. Seaton, B. Daloze, K. Menard, T. Wuerthinger, et al. JRuby+Truffle—a High-Performance Truffle Backend for JRuby, 2015 www.github.com/jruby/jruby/wiki/Truffle), is used to implement such a dependency management and propagation mechanism. In one or more embodiments of the invention, invalidating an assumption (e.g., changing the state of the safepoint indicator (118)) triggers the de-optimization of code dependent on that assumption (e.g., de-optimizing the safepoint check (116)). In one or more embodiments of the invention, as a performance optimization, the safepoint check (116) may be compiled to be "always true", until the initiator thread (104) triggers a mechanism to de-optimize the safepoint check (116), where the de-optimized safepoint check (116) is executed by an interpreter (126).

As shown in FIG. 1, the computer system (100) includes a compiler (124) capable of producing an executable program module from source code (e.g., a guest action (112)). In one or more embodiments of the invention, a compiler is any software, firmware, hardware, or any combination thereof, designed to transform source code written in a programming language (e.g., a guest language (122)) into machine code or an intermediate representation (e.g., a guest language implementation (GLI) action 114) that is capable of being executed by a computer system (100).

As shown in FIG. 1, the computer system (100) includes an interpreter (126). In one or more embodiments of the invention, an interpreter (126) is any kind of interpreter for any programming language now known or later developed. The interpreter (126) includes functionality to translate code (e.g., a guest action (112)) into an intermediate representation (e.g., a guest language implementation action (114)) and execute the intermediate representation. Alternatively, the interpreter (126) includes functionality to directly execute code (e.g., a guest action (112)), or may execute previously compiled code. Further still, the interpreter (126) includes functionality to execute code using some combination of the above methods, and/or any other method now known or later developed.

In one or more embodiments of the invention, actions (106, 108, 112) are designed to be executed in a virtual machine (VM) (128). A VM (128) is a software implementation of a computing device executing on an underlying computing device. A VM (128) may abstract the operating system and hardware of the underlying computer system (100) from actions (106, 108, 112) that are executed in the VM (128). In one or more embodiments of the invention, the VM (128) includes functionality to execute actions (106, 108, 112). In one or more embodiments of the invention, the VM (128) includes functionality to allow execution of a single version of an action (106, 108, 112) on a variety of operating systems (not shown) and hardware systems (not shown).

In one or more embodiments of the invention, the computer system (100) includes a memory (130). In one or more embodiments of the invention, memory (130) is a physical medium for storing information for use by a processor (102) and/or any other component of a computer system (100). Memory (130) may include functionality to store information for any amount of time. For example, memory such as Random Access Memory (RAM) may store information until power is removed from the system. As another example, memory may refer to more permanent storage of the computing device (e.g., hard disk drives, solid state drives, etc.) used, in part, to implement a memory paging scheme. In one or more embodiments of the invention, the memory (130) of a computer system (100) is operatively connected to one or more processors (102) of the computer system (100). In one or more embodiments of the invention, although not shown in FIG. 1, memory (130) may include and/or be operatively connected to one or more memory controllers.

While FIG. 1 shows a configuration of components, other configurations may be used without departing from the scope of the invention. For example, various components may be combined to create a single component. As another example, the functionality performed by a single component may be performed by two or more components.

FIG. 2A and FIG. 2B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2A shows a flowchart describing an abstract, high-level method of initiating guest safepoints, performed by, and from the perspective of the initiator thread (104 in FIG. 1), in accordance with one or more embodiments of the invention. The initiator thread manages the life cycle of the guest safepoint, from initiation to termination, and synchronizes the behavior of the guest threads entering and exiting the guest safepoint. The initiator thread initiates the guest safepoint for the purpose of causing an action to occur in a controlled, predictable execution environment, where there are no surprise modifications of data structures and/or memory accessed and manipulated by the initiator thread. The initiator thread asserts this control over the execution environment by requiring guest threads to execute a specific safepoint action, and only that action.

In Step 210, the guest safepoint is initiated by the initiator thread notifying guest threads of the initiation of the guest safepoint. In accordance with one or more embodiments of the invention, the notification may be passive, for example, and be accomplished by setting or changing the value of a shared variable or data structure in shared memory. With passive notification, the initiator thread does not explicitly notify guest threads, and guest threads may even register for guest safepoints themselves and check for safepoint actions to execute. Alternatively, the notification may be active, by interrupting guest threads to cause the guest threads to check for and enter the guest safepoint. Active notification may also include sending a message to the guest threads. In accordance with one or more embodiments of the invention, the notification may be masked, to prevent one or more guest threads from being interrupted, where an additional mask flag is checked to determine whether a guest thread should be notified of the guest safepoint.

In Step 212, the safepoint action is provided by the initiator thread to the guest threads, either passively or actively, using methods described in the previous paragraph. In accordance with one or more embodiments of the invention, the safepoint action may be arbitrary guest language code (even user-defined signal handlers)—a lambda expression, where run-time data may be captured in a closure. Although the same safepoint action is provided to all guest threads, the safepoint action may be customized to individual guest threads by having portions of the safepoint action conditionally executed depending on the identity of the guest thread. As discussed previously, in accordance with one or more embodiments of the invention, the safepoint action is executed by one or more guest threads during the guest safepoint (while pausing the currently executed guest action).

In Step 214, entry into the guest safepoint by the one or more guest threads is synchronized, in accordance with one or more embodiments of the invention, to ensure that each guest thread waits to execute the safepoint action until all of the guest threads have entered the guest safepoint. This synchronization between the initiator thread and the one or more guest threads may be accomplished by any of the aforementioned mechanisms for communication and synchronization between threads.

In Step 216, the exit of the one or more guest threads from the guest safepoint is synchronized, in accordance with one or more embodiments of the invention, to ensure that each guest thread waits to exit the guest safepoint until all of the guest threads have executed the safepoint action. This technique prevents a guest thread from prematurely resuming its guest action and, thereby, interfering with the predictable, controlled state of the guest safepoint sought by the initiator thread, until the work intended to be performed (i.e., the safepoint action) during the guest safepoint has been accomplished.

To ensure that guest threads are resumed in a smooth manner, in one or more embodiments of the invention, blocking input/output operations, and other blocked operations that may be cumbersome to pause and later resume, may be transferred from guest threads to host VM threads. In such a scenario, guest threads would send their blocking input/output or other requests to the host VM threads and wait for the host VM threads to complete these operations. These "lean" waiting guest threads would be easier to interrupt and resume than if the guest threads themselves performed the blocking input/output or other complex blocking operations.

FIG. 2B shows a flowchart describing an abstract, high-level method of initiating deferred action guest safepoints, performed by the initiator thread, in accordance with one or more embodiments of the invention. The method of FIG. 2B is a variation of the method of FIG. 2A, the main difference being that in FIG. 2B the safepoint action is performed after exiting the deferred action guest safepoint, rather than during the guest safepoint, as in FIG. 2A.

In Step 220, the deferred action guest safepoint is initiated, as discussed above in the description of Step 210.

In Step 222, the safepoint action is provided, as discussed above in the description of Step 212. As discussed previously, in accordance with one or more embodiments of the invention, the safepoint action is executed by one or more guest threads after exiting the deferred action guest safepoint (while pausing the currently executed guest action).

In Step 224, entry into the deferred action guest safepoint by the one or more guest threads is synchronized, in accordance with one or more embodiments of the invention, to ensure that each guest thread waits to exit the deferred action guest safepoint until all of the guest threads have entered the deferred action guest safepoint.

In Step 226, the exit of the one or more guest threads from the deferred action guest safepoint is synchronized, in accordance with one or more embodiments of the invention, to ensure that each guest thread waits to execute the safepoint action until all of the guest threads exit the deferred action guest safepoint. This technique enables the deferred safepoint action to have access to the normal VM services that are not available during the guest safepoint. FIG. 3A and FIG. 3B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3A shows a flowchart describing an abstract, high-level method of processing guest safepoints, performed by, and from the perspective of a guest thread (110 in FIG. 1), in accordance with one or more embodiments of the invention. Guest threads respond to guest safepoint requests initiated by other threads, and comply with the synchronization instructions provided by the initiator thread regarding when to enter and exit the guest safepoint, and when to execute the corresponding safepoint action.

In Step 310, a guest thread determines that a guest safepoint is initiated in order to cooperate with any guest safepoint requests initiated by other threads. In accordance with one or more embodiments of the invention, the determination may be passive, for example, where the guest thread is interrupted by the initiator thread, and caused to check for and enter the guest safepoint. Alternatively, this determination may be active, for example, where the guest thread proactively executes a safepoint check to examine the state of a safepoint indicator or other shared variable or data structure. The safepoint check may be performed at each safe place to pause within the guest action executed by the guest thread.

In Step 312, the guest safepoint is entered. Each guest thread entering the guest safepoint pauses its currently executing guest action, thereby helping to create the quiet, predictable execution environment sought by the initiator of the guest safepoint, and saving its execution state for subsequent resumption.

In Step 314, a safepoint action is executed, in accordance with one or more embodiments of the invention. Each guest thread receives the safepoint action from the initiator thread via any of the aforementioned mechanisms for communication and synchronization between the initiator and guest threads, as discussed above in the description of Step 212.

In Step 316, the guest safepoint is exited, and the paused guest action is resumed, as discussed above in the description of Step 216.

FIG. 3B shows a flowchart describing an abstract, high-level method of processing deferred action guest safepoints, performed by one or more guest threads (110 in FIG. 1), in accordance with one or more embodiments of the invention. The method of FIG. 3B is a variation of the method of FIG. 3A, the main difference being that in FIG. 3B the safepoint action (108 in FIG. 1) is performed after exiting the deferred action guest safepoint, rather than during the guest safepoint, as in FIG. 3A.

In Step 320, a guest thread determines that a guest safepoint is initiated, in order to cooperate with any guest safepoint requests initiated by other threads, as discussed earlier in the description of Step 310.

In Step 322, the guest safepoint is entered. Each guest thread entering the deferred action guest safepoint pauses its currently executing guest action, as discussed earlier in the description of Step 312.

In Step 324, after exiting the deferred action guest safepoint, a safepoint action is executed, concurrently with the execution of other guest threads, in accordance with one or more embodiments of the invention. See the earlier description of Step 314. Since the safepoint action in Step 324 is executed after the guest thread exits the guest safepoint, the safepoint action has access to the normal VM services that were unavailable during the guest safepoint.

In Step 326, the paused guest action is resumed, as discussed above in the description of Step 216.

Figure 4:
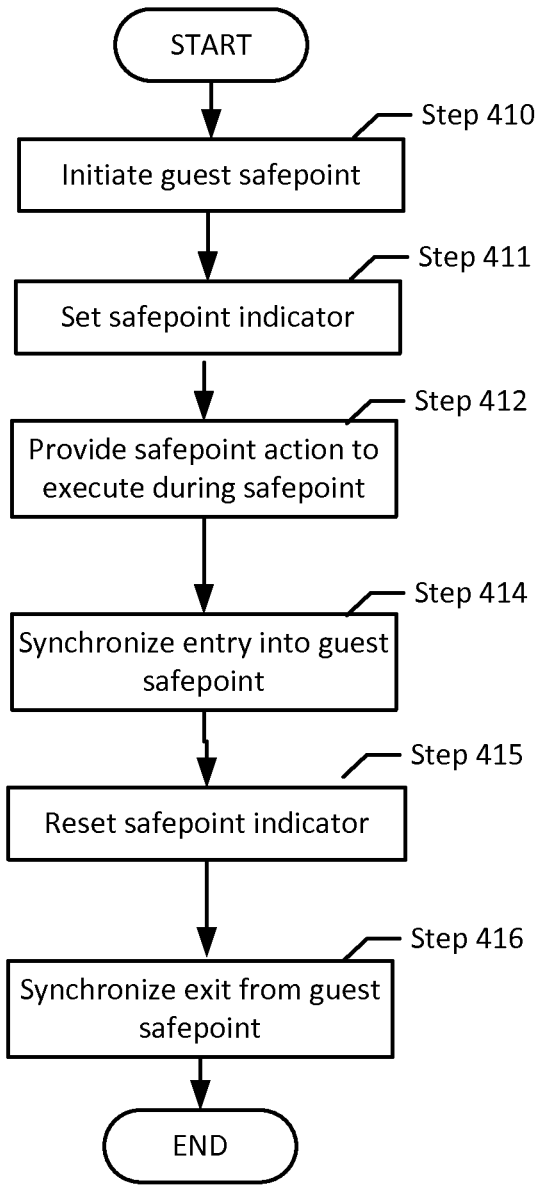
FIG. 4 and FIG. 5 show flowcharts in accordance with one or more embodiments of the invention.
Figure 5:
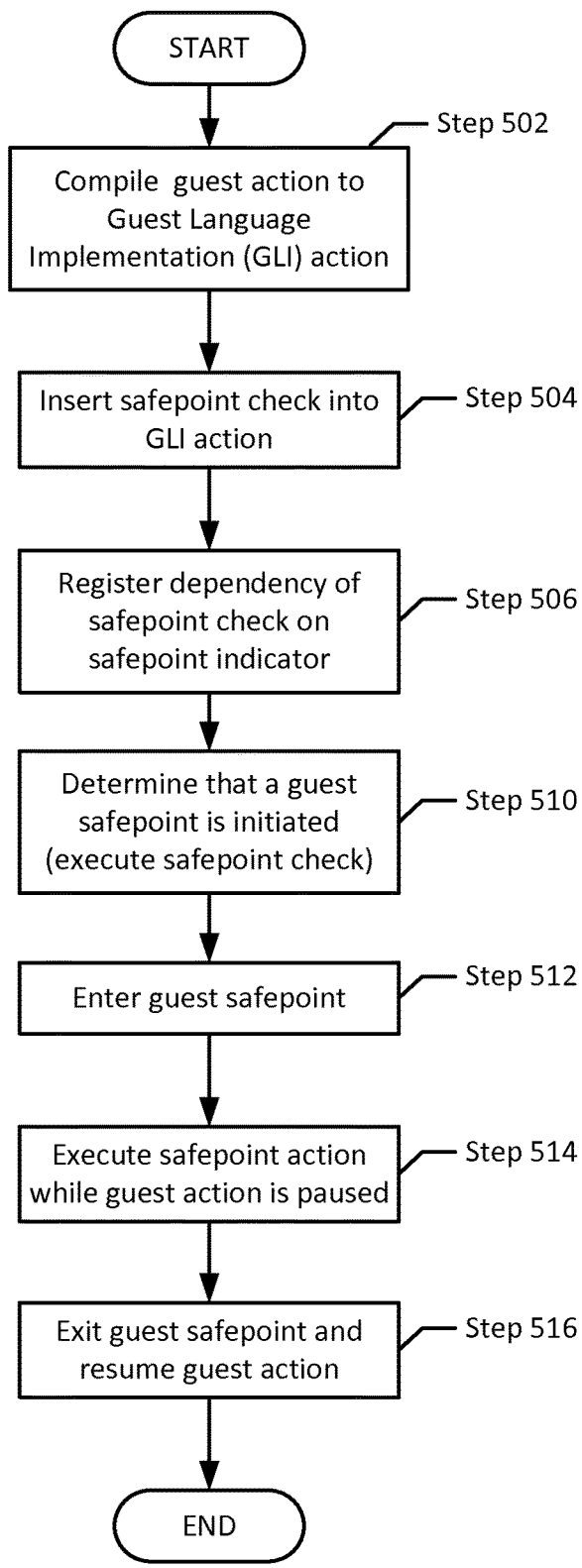

FIG. 4 and FIG. 5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows a flowchart describing, in more detail, the method of initiating guest safepoints, performed by the initiator thread (104 in FIG. 1), in accordance with one or more embodiments of the invention. The method of FIG. 4 is a variation of the method of FIG. 2A, the main difference being that in FIG. 4 there are two additional steps (Step 411 and Step 415) to modify the state of the safepoint indicator (118 in FIG. 1) when a guest safepoint is first initiated, and again after entry into the guest safepoint is synchronized, permitting reuse of the safepoint indicator for subsequent guest safepoints.

In Step 410, the guest safepoint is initiated. See earlier description of FIG. 2A and Step 210.

In Step 411, as discussed previously, in accordance with one or more embodiments of the invention, the initiation of a guest safepoint may be indicated by a safepoint indicator. The safepoint indicator may be implemented in a variety of ways, including (but not limited to): a Boolean variable, a volatile variable, a flag, a mutex, and an assumption (as in the Truffle language implementation framework). Regardless of how the safepoint indicator is implemented, initiating the guest safepoint involves changing the state of the safepoint indicator to indicate that a guest safepoint is initiated. In accordance with one or more embodiments of the invention, initiating the guest safepoint may involve interrupting each guest thread. In accordance with one or more embodiments of the invention, initiating the guest safepoint may trigger de-optimizing each guest thread (110) to jump to an interpreter to execute a safepoint check.

In Step 412, the safepoint action is provided, as discussed above in the description of Step 212.

In Step 414, entry into the guest safepoint by the one or more guest threads is synchronized, in accordance with one or more embodiments of the invention. In accordance with one or more embodiments of the invention, this synchronization includes waiting for the guest threads to finish de-optimizing their safepoint checks. In one or more embodiments of the invention, de-optimizing the safepoint checks in GLI actions occurs within a VM safepoint, enabling the guest safepoint to reuse a VM safepoint. The guest thread enters the guest safepoint if the safepoint check discovers that a guest safepoint is initiated based on the state of the safepoint indicator.

In Step 415, in accordance with one or more embodiments of the invention, the state of the safepoint indicator is reset, now that all guest threads have entered the guest safepoint. This prevents a guest thread from re-entering the guest safepoint during the execution of the safepoint action, since the safepoint action could potentially encounter another safepoint check.

In Step 416, the exit of the one or more guest threads from the guest safepoint is synchronized, as discussed previously in the description of Step 216.

FIG. 5 shows a flowchart describing, in more detail, the method of processing guest safepoints, performed by one or more guest threads (110 in FIG. 1), in accordance with one or more embodiments of the invention. The method of FIG. 5 is a variation of the method of FIG. 3A, the main difference being that in FIG. 5 there are additional steps (Steps 502, 504, and 506) to compile a guest action (112 in FIG. 1), insert a safepoint check (116 in FIG. 1) into a compiled GLI action (114 in FIG. 1), and register a safepoint check (116 in FIG. 1) in a registry (120 in FIG. 1).

In Step 502 of FIG. 5, in accordance with one or more embodiments of the invention, a compiler compiles a guest action into a guest language implementation (GLI) action.

In Step 504, a safepoint check is inserted into a GLI action. As previously discussed, in accordance with one or more embodiments of the invention, a safepoint check may be inserted into a guest language implementation (GLI) action at the start of each method, and within each loop. In accordance with one or more embodiments of the invention, the safepoint check examines the state of a safepoint indicator. As discussed earlier, in one or more embodiments of the invention, as a performance optimization, the safepoint check may be compiled to be "always true" to reduce the overhead associated with performing frequent safepoint checks. In one or more embodiments of the invention, the safepoint check may be de-optimized, once the safepoint indicator indicates the initiation of a guest safepoint, to jump to an interpreter to perform the safepoint check. In one or more embodiments of the invention, the safepoint indicator may be implemented via an assumption (as in the Truffle language implementation framework), whose state change indicates the initiation of a guest safepoint.

In Step 506, the dependency of the safepoint check on a safepoint indicator is registered in a registry, in accordance with one or more embodiments of the invention. This dependency information is the basis for triggering the de-optimization of the safepoint check when the safepoint indicator is modified.

Steps 510, 512, 514 and 516 are effectively the same as Steps 310, 312, 314 and 316 of FIG. 3A. In Step 510, in one or more embodiments of the invention, the guest safepoint is determined to be initiated by executing a safepoint check.

In Step 512, the guest safepoint is entered. Each guest thread entering the guest safepoint pauses its currently executing guest action.

In Step 514, a safepoint action is executed, in accordance with one or more embodiments of the invention.

In Step 516, the guest safepoint is exited, and the paused guest action is resumed, in accordance with one or more embodiments of the invention.

The following example is for explanatory purposes only and not intended to limit the scope of the invention.

Figure 6:
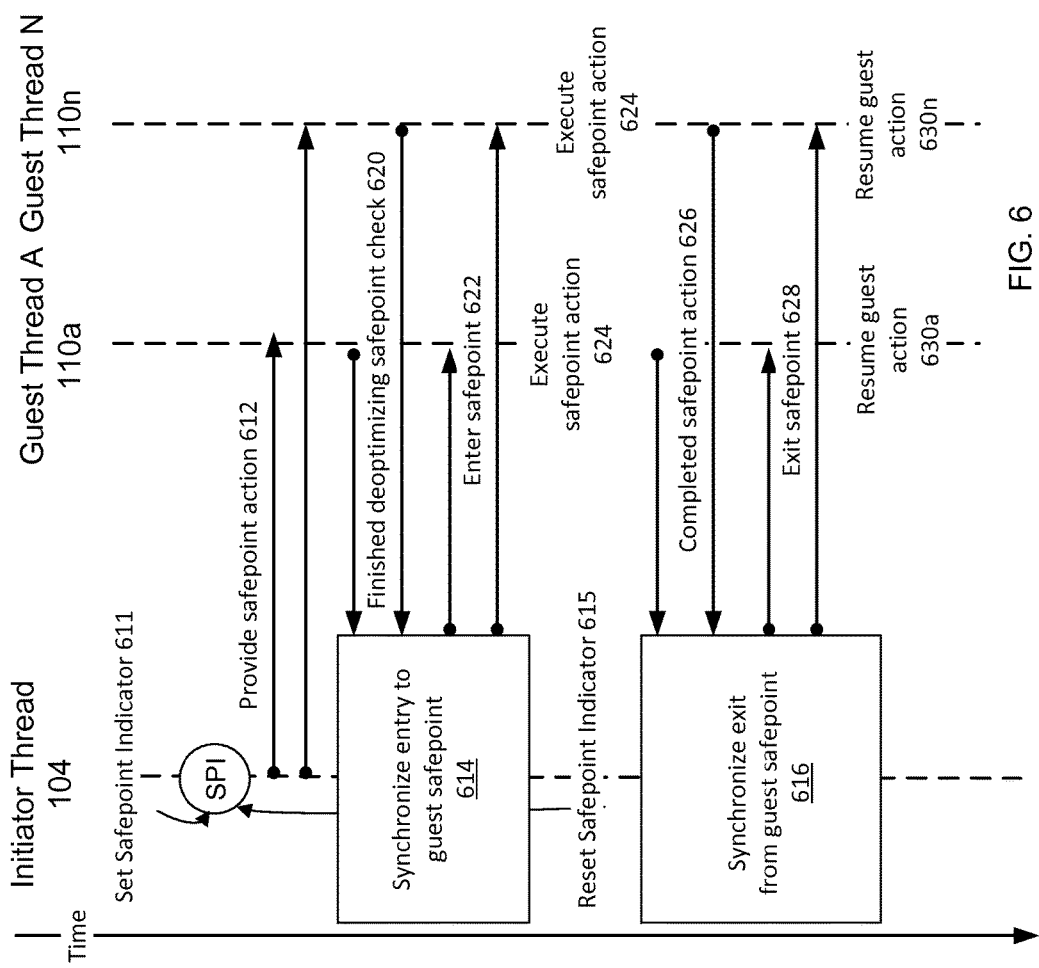
FIG. 6 and FIG. 7 show examples in accordance with one or more embodiments of the invention.
Figure 7:
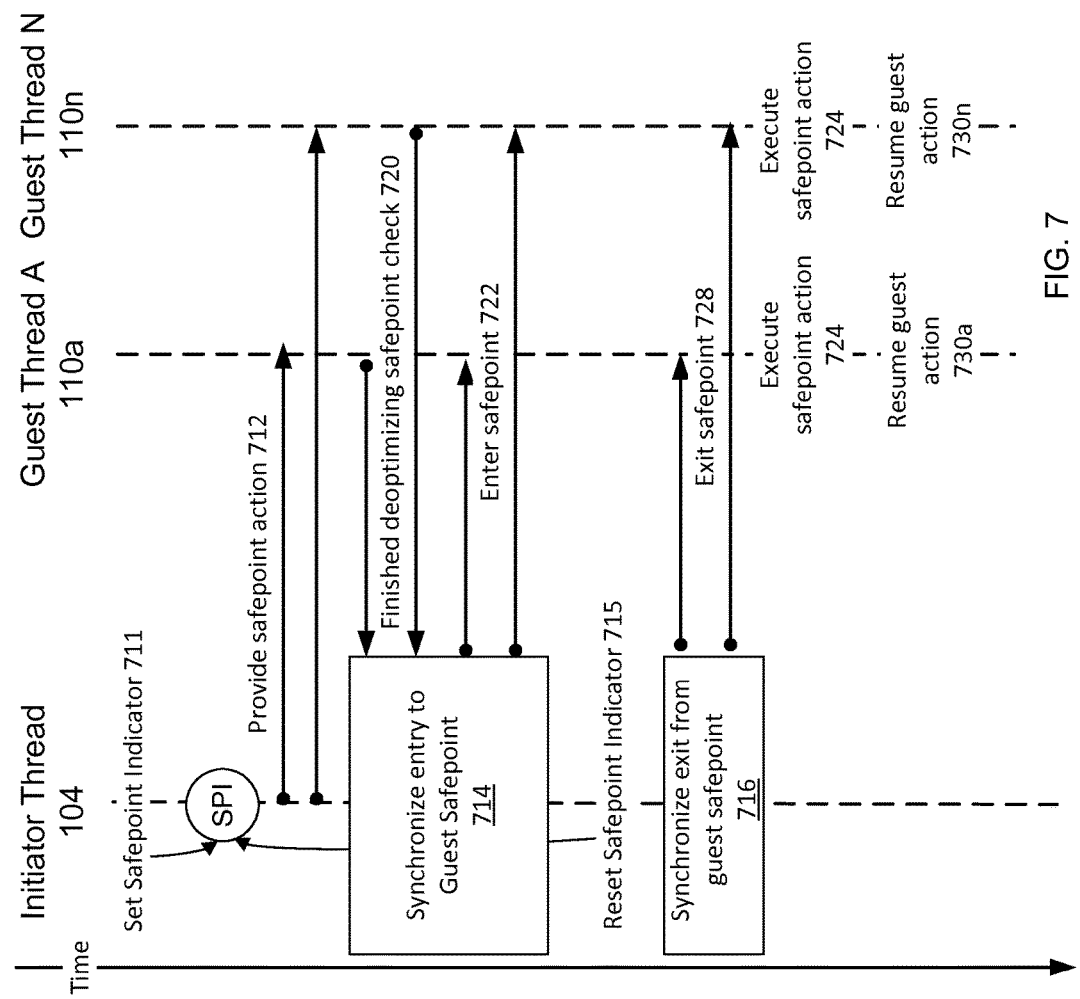

FIG. 6 and FIG. 7 illustrate possible scenarios, in accordance with one or more embodiments of the invention, showing the relative timing of steps that may be performed by the initiator thread (104 in FIG. 1) and one or more guest threads (110a-110n in FIG. 1), in accordance with the flowcharts in FIG. 2A, FIG. 2B, FIG. 3A, FIG. 3B, FIG. 4 and FIG. 5. These steps are also described in the context of an API for an initiator thread (104 in FIG. 1) and an API for guest threads (110a-110n in FIG. 1). FIG. 6 shows a sequence of steps corresponding to a guest safepoint; FIG. 7 shows a similar sequence of steps corresponding to a deferred action guest safepoint. The discussion will use the scenario of detecting potentially unsafe execution to illustrate a practical use of the API. When a thread detects potentially unsafe activity (e.g., indicated by a certain type of event or measurement), it initiates a safepoint and instructs other guest threads to perform a safety inspection and cleanup action, local to the scope of each guest thread, in an attempt to detect actual problems and repair any damage.

The initiator API triggers a guest safepoint and requests that guest threads execute a safepoint action. The guest API cooperates with this request for a guest safepoint. Toward this end, in accordance with one or more embodiments of the invention, guest threads invoke the guest API at every code location that is a safepoint check, just in case a safepoint is initiated that requires the cooperation of the guest thread. Due to the significant overhead associated with performing frequent safepoint checks, the aforementioned compiler optimization (substituting the safepoint check with "always true") may be employed, in conjunction with the mechanism for triggering the de-optimization of the safepoint check once a guest safepoint is actually initiated.

An API for an initiator thread initiating a guest safepoint accepts a list of one or more guest threads, a safepoint action, and performs steps 611, 612, 614, 615, and 616 shown in FIG. 6. These steps parallel the steps from FIG. 4, described previously.

In Step 611, a thread causes the initiation of a guest safepoint by setting the value of a safepoint indicator (SPI). This initiation in turn triggers the de-optimization of guest threads whose safepoint checks are dependent on the SPI, as indicated in a registry—see discussion of the guest API and Steps 620-630 below.

In Step 612, the safepoint action is provided. In this scenario, execution of the safepoint action inspects the objects and other data structures within the scope of each guest thread, and perform any required preventive or repair operations. For example, it may be the case that the preventive or repair operations may include killing a guest action that was paused upon a guest thread's entry into the guest safepoint and/or killing the guest thread itself. Some of the preventive or repair operations may be conditional on the identity of the guest thread, and may be executed only in certain guest threads.

In Step 614, entry into the guest safepoint by the one or more guest threads is synchronized by the initiator thread API, as indicated by Step 622. In accordance with one or more embodiments of the invention, synchronizing entry into the guest safepoint includes waiting for the guest threads to finish de-optimizing their safepoint checks, as indicated by Step 620.

In Step 615, in accordance with one or more embodiments of the invention, the state of the SPI is reset, once all guest threads have entered the guest safepoint (to prevent guest threads from re-entering the guest safepoint, and enabling the SPI to be used to indicate the initiation of subsequent guest safepoints).

In Step 616, the exit of the one or more guest threads from the guest safepoint is synchronized by the initiator thread API, as indicated by Step 628. In accordance with one or more embodiments of the invention, synchronizing the exit from the guest safepoint includes waiting for the guest threads to complete execution of a safepoint action, as depicted in Step 626. Once the guest threads have exited the guest safepoint, the guest threads resume the previously paused guest actions, without any possibility of interfering with the tightly controlled environment of the guest safepoint.

In accordance with one or more embodiments of the invention, the API for a guest thread executes a safepoint check (see Step 620), and enters a guest safepoint if the safepoint check indicates that a guest safepoint is initiated. The guest API also executes a safepoint action, as shown in Step 624 (where each guest thread executes the same safepoint action), as instructed by an initiator thread, while pausing a guest action. The paused guest action is resumed after exiting the guest safepoint (i.e., after the safepoint check exits), as shown in Step 630a (guest thread A) and Step 630n (guest thread N) in FIG. 6 (where the different guest threads execute different guest actions (630a-630n)). The same API for guest threads is used in FIG. 7, described below, which depicts a deferred action guest safepoint, in which case different synchronization instructions are provided by the initiator thread (i.e., to require the safepoint action to be executed after the guest thread exits the deferred action guest safepoint). The steps performed by the guest API parallel the steps from FIG. 5, described previously.

For deferred action guest safepoints, as shown in FIG. 7, the scenario is similar to that described in FIG. 6, except that the safepoint action is executed just after the deferred action guest safepoint is exited.

An API for an initiator thread initiating a deferred action guest safepoint accepts a list of one or more guest threads, a safepoint action, and performs steps 711, 712, 714, 715, and 716 shown in FIG. 7.

In Step 711, the initiation of a guest safepoint is indicated by setting the value of a safepoint indicator (SPI), as discussed in the previous description of Step 611.

In Step 712, the safepoint action is provided, as discussed in the previous description of Step 612.

In Step 714, entry into the guest safepoint by the one or more guest threads is synchronized by the initiator thread API, as depicted in Step 722. In accordance with one or more embodiments of the invention, synchronizing entry into the guest safepoint includes waiting for the guest threads to finish de-optimizing their safepoint checks, as depicted in Step 720.

In Step 715, in accordance with one or more embodiments of the invention, the state of the SPI is reset, once all guest threads have entered the guest safepoint, as discussed in the previous description of Step 615.

In Step 716, the exit of the one or more guest threads from the guest safepoint is synchronized by the initiator thread API, as illustrated in Step 728.

The API (described in the discussion of FIG. 6) for a guest thread executes a safepoint check (see Step 720), and enters a guest safepoint if the safepoint check indicates that a guest safepoint is initiated. The guest API executes a safepoint action, as shown in Step 724 (each guest thread executes the same safepoint action), after exiting the deferred action guest safepoint. In the deferred action guest safepoint, the safepoint action is executed concurrently with the execution of other guest threads.

The paused guest action is resumed after the safepoint action is executed, as shown in Step 730a (guest thread A) and Step 730n (guest thread N) in FIG. 7 (the different guest threads execute different guest actions).

Embodiments of the invention may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (812). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
   a virtual machine;
   an initiator thread configured to:
      execute a first action represented in a guest language on the virtual machine with functionality to initiate a guest safepoint and to provide a safepoint action; and
      trigger, in response to initiating the guest safepoint, de-optimization of a safepoint check configured to determine whether the guest safepoint is initiated;
   a first group of one or more guest threads, wherein each guest thread in the first group of one or more guest threads is configured to:
      execute a guest action represented in a guest language on the virtual machine,
      execute the safepoint action while execution of the guest action is paused, and resume execution of the guest action once the safepoint action completes execution in each guest thread in the first group of one or more guest threads; and a compiler configured to:
translate the guest action to a guest language implementation action represented in guest language implementation code;
insert the safepoint check within the guest language implementation action; and
optimize the safepoint check.

2. The system of claim 1, further comprising a registry configured to represent a dependency of the safepoint check on a safepoint indicator.

3. The system of claim 1, wherein de-optimization of the safepoint check comprises invoking an interpreter.

4. The system of claim 1,
wherein the first group of one or more guest threads is further configured to execute the safepoint action concurrently with the execution of a second group of one or more guest threads, and
wherein each guest thread in the second group of one or more guest threads is configured to execute a guest action represented in a guest language.

5. A method for implementing a guest safepoint, comprising:
translating a guest action to a guest language implementation action represented in guest language implementation code;
inserting, within the guest language implementation action, a safepoint check configured to determine whether the guest safepoint is initiated;
optimizing the safepoint check;
initiating the guest safepoint by an action represented in a guest language;
triggering, in response to initiating the guest safepoint, de-optimization of the safepoint check;
providing a safepoint action to be executed during the guest safepoint;
synchronizing entry into the guest safepoint; and
synchronizing exit from the guest safepoint.

6. The method of claim 5, wherein execution of the safepoint action is deferred until after the guest safepoint terminates.

7. The method of claim 5, further comprising:
setting a safepoint indicator indicating that the guest safepoint is initiated; and
resetting the safepoint indicator once entry into the guest safepoint is synchronized.

8. A method for implementing a guest safepoint, comprising:
translating a guest action to a guest language implementation action represented in guest language implementation code;
inserting, within the guest language implementation action, a safepoint check configured to determine whether the guest safepoint is initiated, wherein the safepoint check is de-optimized when the guest safepoint is initiated;
optimizing the safepoint check;
determining, by executing the safepoint check, whether the guest safepoint is initiated;
entering the guest safepoint;
executing a safepoint action while execution of the guest action is paused; and
exiting the guest safepoint and resuming execution of the guest action.

9. The method of claim 8, wherein execution of the safepoint action is deferred until after exiting the guest safepoint.

10. The method of claim 8, further comprising registering, in a registry, a dependency of the safepoint check on a safepoint indicator.

11. The method of claim 8, wherein de-optimizing the safepoint check comprises invoking an interpreter.

12. An application programming interface (API), comprising executable code stored in a memory and executed on a computer processor, further comprising:
an initiator configured to:
initiate a guest safepoint via a first action represented in a guest language executed on a virtual machine,
trigger, in response to initiating the guest safepoint, de-optimization of a safepoint check configured to determine whether the guest safepoint is initiated,
provide a safepoint action to a first group of one or more guest threads,
synchronize the first group of one or more guest threads such that each guest thread in the first group of one or more guest threads executes the safepoint action once all guest threads in the first group of one or more guest threads enter the guest safepoint, and
synchronize the first group of one or more guest threads such that each guest thread in the first group of one or more guest threads exits the guest safepoint once all guest threads in the first group of one or more guest threads complete execution of the safepoint action; and
a guest configured to:
translate a guest action represented in a guest language to a guest language implementation action represented in guest language implementation code,
insert the safepoint check within the guest language implementation action, and
optimize the safepoint check.

13. The API of claim 12,
wherein the guest is further configured to:
determine, by executing the safepoint check, whether the guest safepoint is initiated,
enter the guest safepoint,
execute the safepoint action while execution of the guest action is paused, and
exit the guest safepoint and resume execution of the guest action once the safepoint action completes execution.

14. The API of claim 12, wherein execution of the safepoint action by each guest thread in the first group of one or more guest threads is deferred until after exiting the guest safepoint.

15. The API of claim 12, wherein de-optimization of the safepoint check comprises invoking an interpreter.

16. The API of claim 12, wherein the initiator is further configured to:
synchronize the first group of one or more guest threads such that each guest thread in the first group of one or more guest threads executes the safepoint action once all guest threads in the first group of one or more guest threads de-optimize a safepoint check.

17. The API of claim 12, wherein the initiator is further configured to:
set a safepoint indicator; and
reset the safepoint indicator once each guest thread in the first group of one or more guest threads enters the guest safepoint.

18. The API of claim 13, wherein executing the safepoint check further comprises checking a safepoint indicator.

\* \* \* \* \*

UNITED STATES PATENT AND TRADEMARK OFFICE
CERTIFICATE OF CORRECTION

PATENT NO. : 9,880,931 B2
APPLICATION NO. : 14/931968
DATED : January 30, 2018
INVENTOR(S) : Seaton et al.

Page 1 of 1

It is certified that error appears in the above-identified patent and that said Letters Patent is hereby corrected as shown below:

On the Title Page

Column 1, under Inventors, Line 2, delete "Obersterreich (AT)" and insert -- Oberosterreich (AT) --, therefor.

Signed and Sealed this
Fourteenth Day of August, 2018

Andrei Iancu
*Director of the United States Patent and Trademark Office*